(12) United States Patent
Kang (10) Patent No.: US 6,621,547 B2
(45) Date of Patent: Sep. 16, 2003

(54) MODULE FOR DETERMINING THE DRIVING SIGNAL TIMING AND A METHOD FOR DRIVING A LIQUID CRYSTAL DISPLAY PANEL

(75) Inventor: Sin-Gu Kang, Kyongki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 375 days.

(21) Appl. No.: 09/736,281

(22) Filed: Dec. 15, 2000

(65) Prior Publication Data

US 2002/0000961 A1 Jan. 3, 2002

(30) Foreign Application Priority Data

Dec. 15, 1999 (KR) ........................... 1999-57988

(51) Int. Cl.⁷ ........................... G02F 1/1345; G09G 3/30
(52) U.S. Cl. ........................... 349/151; 349/152; 345/80
(58) Field of Search ................. 349/151, 152; 345/80, 98, 90

(56) References Cited

U.S. PATENT DOCUMENTS

| | | | | |
|---|---|---|---|---|
| 5,608,558 A | * | 3/1997 | Katsumi | 349/192 |
| 5,737,053 A | * | 4/1998 | Yomogihara et al. | 349/149 |
| 6,061,246 A | * | 5/2000 | Oh et al. | 361/749 |
| 6,104,370 A | * | 8/2000 | Nakagaki et al. | 345/100 |
| 6,157,357 A | * | 12/2000 | Kim | 345/87 |
| 6,456,271 B1 | * | 9/2002 | Tamai et al. | 345/100 |
| 6,456,353 B1 | * | 9/2002 | Chen | 349/150 |
| 6,515,679 B1 | * | 2/2003 | Igarashi | 345/698 |
| 2002/0050968 A1 | * | 5/2002 | Tanaka et al. | 345/87 |
| 2003/0043105 A1 | * | 3/2003 | Hirakata | 345/96 |

* cited by examiner

*Primary Examiner*—Toan Ton
*Assistant Examiner*—Mike Qi
(74) *Attorney, Agent, or Firm*—McGuireWoods LLP (57) ABSTRACT

Disclosed is a gate printed circuit board, a connector-free liquid crystal display (LCD) panel assembly, a driving-signal timing module included in the liquid crystal display (LCD) panel assembly, and a method of driving the liquid crystal display (LCD) panel assembly. According to the present invention, since a separate connector and a gate printed circuit board of a conventional LCD panel is not required for applying a gate-driving signal generated from an external information processing device, a thickness and the number of parts of the LCD device is reduced. Further, when the gate-driving signal is transmitted through the TFT substrate, the voltage $V_{off}$ for maintaining a thin-film transistor (TFT) in a turned-off state is modified so that users may not recognize the imbalance in brightness.

22 Claims, 6 Drawing Sheets

MODULE FOR DETERMINING THE DRIVING SIGNAL TIMING AND A METHOD FOR DRIVING A LIQUID CRYSTAL DISPLAY PANEL

BACKGROUND OF THE INVENTION

1. Field of the Invention

The present invention relates to a display device, and more particularly, to a module for determining the time for a driving signal to be applied in which one frame is progressed while suddenly generating a deviation in a gate-driving signal at a specific interval when driving a liquid crystal display device without a gate printed circuit board, which allows the gate-driving signal to be modified such that it has a certain drift within one frame thereby preventing a screen of the liquid crystal display device from being displayed with it being divided into a plurality of screens.

Also, the present invention relates to a liquid crystal display panel assembly in which levels of output signals of all the gate lines outputted from a module for determining the time for a gate-driving signal to be applied are tuned to have a certain drift so that a gate-driving signal is modulated with it having a certain drift during one frame, thereby preventing a screen of the liquid crystal display device from being displayed with it being divided into a plurality of screens.

Further, the present invention relates to a method for driving a liquid crystal display (LCD) panel assembly in which, although a plurality of modules for determining the time for a driving signal to be applied are used to apply a gate-driving signal to a plurality of gate lines so that the gate-driving signal is decreased or increased linearly, there is generated no sudden variation in the gate driving-signal between the modules.

2. Description of the Related Art

In recent years, as the development of information processing devices for processing a variety of information has been accelerated, a large amount of information can be processed during a short period of time and the processed information can be obtained.

Since such data processed in the information processing device is still of electrical signal forms, the operator needs a display device or interface device to see the results.

For this reason, the display device has rapidly developed along with the development of the information processing device. Currently, a liquid crystal display device is being developed that can achieve the same resolution and full color spectrums as those of Cathode Ray Tube (CRT) type display device, and in the mean time, which is more advantageous than the CRT type display device in regard to volume and weight.

Since the technology relating to such a liquid crystal display device follows a trend toward having high resolution, full-color and a large screen which are advantages of a CRT type display device, and reduced volume and weight or intrinsic advantages of the liquid crystal display device unlike the CRT type display device, it is expected that more compact and lighter liquid crystal display devices would appear in the near future.

SUMMARY OF THE INVENTION

Therefore, the present invention has been made in view of the above-mentioned problems, and it is an object of the present invention to reduce volume occupied by gate printed circuit boards or medium for transmitting gate-driving signals to gate lines and weight thereof, as well as to prevent the generation of division of a screen and imbalance in brightness due to a delay and a distortion of a gate-driving signal by modulation of the gate-driving signal generated when passing a thin-film transistor (TFT) substrate and a module for determining the time for the gate-driving signal to be applied.

Another object of the present invention is to prevent the generation of division of a screen and imbalance in brightness of a liquid crystal display device due to a delay and a modulation of a gate-driving signal generated when applying the gate-driving signal by linearly increasing or decreasing a signal level of the gate-driving signal applied to a gate line.

Another object of the present invention is to prevent the generation of division of a screen and imbalance in brightness of a liquid crystal display device by adjusting a signal level of a gate-driving signal delayed and modulated.

According to an aspect of the present invention, there is provided a module for determining the time for a driving signal to be applied for use in a liquid crystal display (LCD) device, comprising:

a flexible base substrate;

a gate-driving signal input line formed on one side of the base substrate so that a gate-driving signal is applied to the gate-driving signal input line;

a gate-driving IC mounted on the base substrate to be connected to the gate-driving signal input line, the gate driving IC adapted to modify linearly a level of the gate-driving signal inputted to a first gate line through a last gate line of a plurality of gate lines formed on a TFT substrate when allowing the applied gate-driving signal to be diverged in a parallel way so as to input it to the plurality of gate lines, and then, output the linearly modified gate-driving signal through output terminals thereof; and a plurality of gate-driving signal output lines formed on the base substrate in such a manner that the plurality of gate-driving signal output lines are connected to the output terminals of the gate driving IC, the plurality of gate-driving signal output lines adapted to allow the gate-driving signal outputted from the output terminals of the gate-driving IC to have a linear level and to be applied to the plurality of gate lines.

According to another aspect of the present invention, there is provided a liquid crystal display (LCD) panel assembly, comprising:

an integrated printed circuit board (PCB) adapted to generate a gate-driving signal and a data-driving signal;

a liquid crystal display (LCD) panel including a TFT substrate having a plurality of columns of data lines formed thereon so that the data-driving signal is applied to a plurality of thin-film transistors (TFTs) formed in a matrix form on a transparent substrate, a plurality of rows of gate lines formed thereon so that the gate-driving signal is applied to the plurality of thin-film transistors (TFTs), and pixel electrodes formed thereon so that a certain signal is applied thereto and maintained, the pixel electrode being connected to the plurality of thin-film transistors (TFTs), a color filter substrate having common electrodes opposite to the pixel electrodes and RGB pixels formed thereon, and a liquid crystal material sealed between the color filter substrate and the TFT substrate;

at least one data-driving signal applying time-determining module adapted to apply the data-driving signal to the plurality of columns of data lines allocated, at a designated time;

at least one gate-driving signal applying time-determining module adapted to apply the gate-driving signal to the plurality of rows of gate lines allocated, at a designated time; and a signal transmitting means having a first signal transmitting means allowing the gate-driving signal to be applied to the TFT substrate from the integrated PCB, a second signal transmitting means allowing the gate-driving signal to be applied to the gate-driving signal applying time-determining module from the TFT substrate, and a third signal transmitting means allowing the gate-driving signal to be applied to another gate-driving signal applying time-determining module adjacent to the gate-driving signal applying time-determining module therefrom, the signal transmitting means being adapted to adjust the gate-driving signal outputted from each of the gate-driving signal applying time-determining modules in such a manner that the gate-driving signal is modified linearly.

According to another aspect of the present invention, there is provided a method of driving a liquid crystal display (LCD) panel assembly, comprising:

applying a gate-driving signal generated from an integrated printed circuit board (PCB) to a plurality of gate lines formed on a liquid crystal display (LCD) panel so that a level of a turn-off signal for maintaining a thin-film transistor (TFT) formed on the liquid crystal display (LCD) panel in a turned-off state among the applied gate-driving signal is modified linearly as the gate line goes from a first gate line to a last gate line of the plurality of gate lines;

applying a corresponding data-driving signal generated from the integrated printed circuit board (PCB) to a plurality of data lines formed on the LCD panel; and selecting any one of the plurality of gate lines, and then applying a turn-on signal generated from the integrated printed circuit board (PCB) to the selected gate line for a predetermined period of time.

BRIEF DESCRIPTION THE DRAWINGS

The foregoing and other objects, features and advantages of the present invention will become more apparent from the following detailed description when taken in conjunction with the accompanying drawings in which.

DESCRIPTION OF THE PREFERRED EMBODIMENTS

Reference will now be made in detail to the preferred embodiments of the present invention.

Now, a liquid crystal display (hereinafter, referred to as "LCD") panel assembly in which gate-driving signals are applied to gate lines while not generating distortion of the gate-driving signals applied to the gate lines without a gate printed circuit board and a connector functioning as media for transmitting the gate-driving signals generated from a printed circuit board to the gate lines and a method of driving the LCD panel assembly for implementing the same will be described in detail hereinafter with reference to the accompanying drawings.

Figure 1:
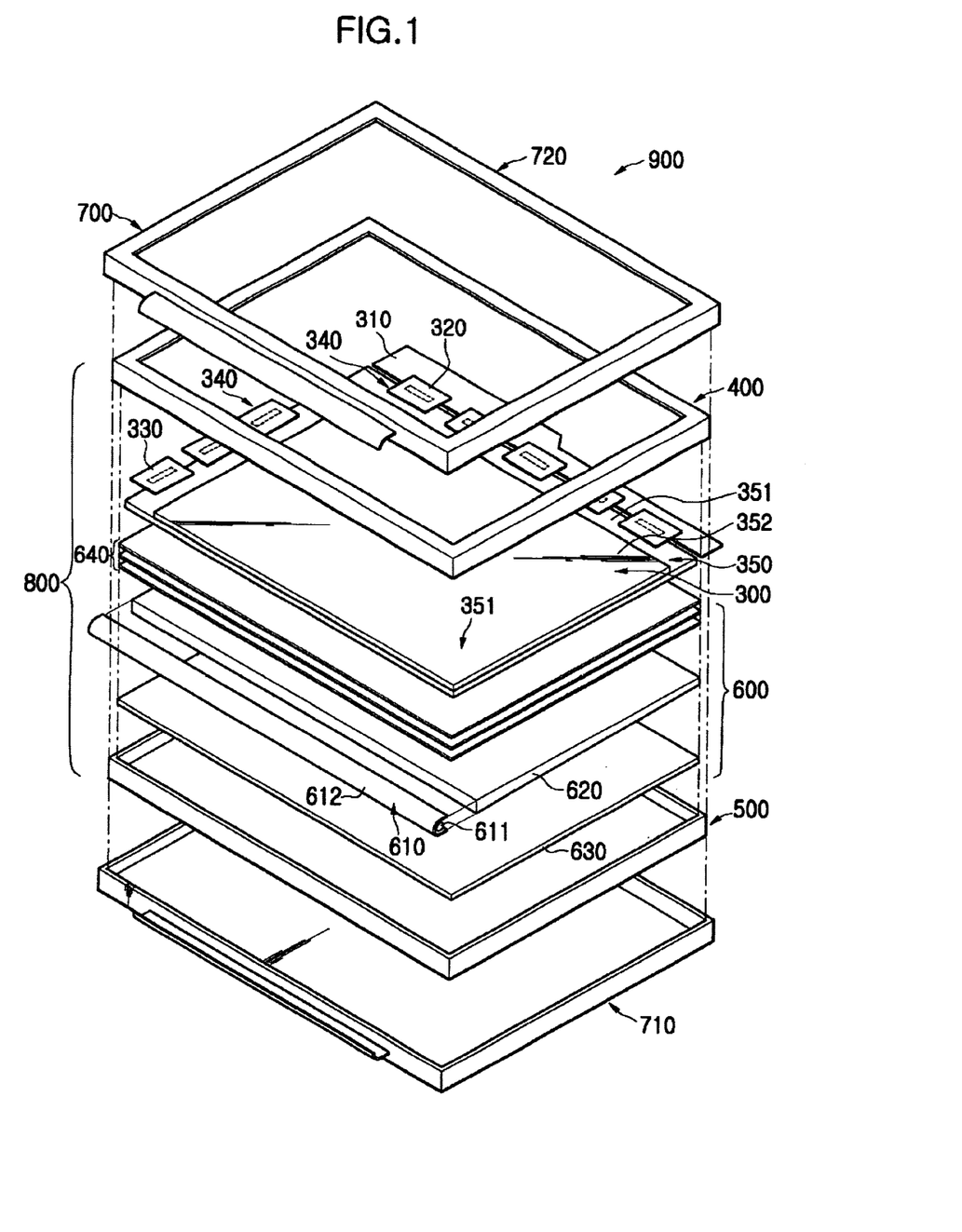
FIG. 1 is an exploded perspective view illustrating a liquid crystal display (LCD) device according to the present invention.

FIG. 1 is an exploded perspective view illustrating an LCD device according to the present invention.

Referring to FIG. 1, the LCD device 900 including an LCD panel assembly 300 comprises an LCD module 800 and a casing 700.

More specifically, the LCD module 800 includes an LCD panel assembly 300, a back light unit 600, a receptacle 500 for receiving the LCD panel assembly 300 and the back light unit 600, and a chassis for preventing the back light unit 600 and the LCD panel assembly 300 from being separated from the receptacle 500. The casing 700 includes a rear casing 710 having a receiving space therein for receiving the LCD module 800 and a front casing 720 engaged with the front casing 710.

The LCD panel assembly 300 includes an integrated printed circuit board (PCB) 310, a driving signal timing module 340 consisting of a data-driving signal timing module 320 and a gate-driving signal timing module 330, and an LCD panel 350.

The integrated printed circuit board (PCB) 310 generates a gate-driving signal corresponding to a video signal applied thereto from an external information processing device, a data-driving signal, and a plurality of drive timing signals required for determining the time for the gate-driving signal and the data-driving signal to be applied to a gate line and a data line, respectively.

For the implementation of this, there are mounted a timing controller (not shown) adapted to generate the drive timing signal, a voltage generator (not shown) adapted to generate a voltage $V_{on}$ for turning-on a thin-film transistor (TFT) formed on a TFT substrate which will be described later, a voltage $V_{off}$ for maintaining the thin-film transistor (TFT) at a turned-off state and a reference voltage $V_{com}$ of a turn-on and a turn-off of the thin-film transistor (TFT), etc., and a gray scale voltage generator (not shown) adapted to generate a gray scale voltage required for generating a gray scale necessary for a full color display operation.

Such an integrated printed circuit board (PCB) 310 functions as software for driving the LCD device 900, while the LCD panel 350 and the driving signal timing module 340, which will be described later, functions as hardware for displaying an actual video by various signals generated from the integrated printed circuit board (PCB) 310.

For the implementation of this, the LCD panel 350 includes a color filter substrate 351, a TFT substrate 352, and a liquid crystal material(not shown) sealed between the color filter substrate 351 and the TFT substrate 352.

The color filter substrate 351 has a transparent substrate, preferably a square plate shaped glass substrate with a high transparency, an RGB pixel pattern formed on one side surface of the glass substrate by a semiconductor thin film producing process, and a transparent electrode made of Indium Tin Oxide material having a low electric resistance formed on a top surface of the RGB pixel. A certain voltage is always applied to the pixel electrode, which may also be defined as a common electrode.

The color filter substrate 351 as constructed above is disposed below the TFT substrate 352 in an overlapping form with them being opposite to each other. A space between the color filter substrate 351 and the TFT substrate 352 is filed with a liquid crystal material (not shown) having a thickness of a few μm and is sealed hermetically so that the liquid crystal material is not leaked out therefrom.

Figure 2:
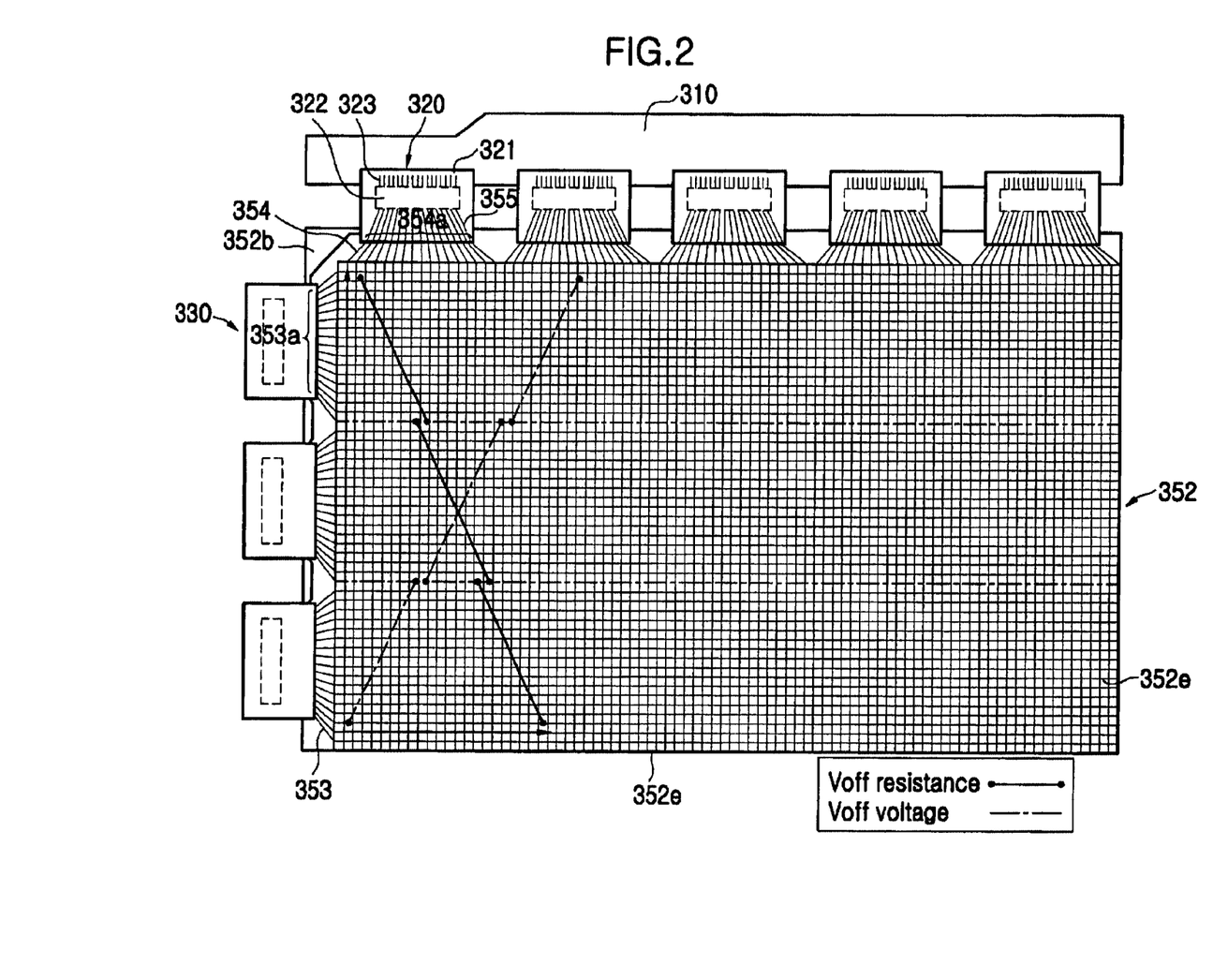
FIG. 2 is a plan view illustrating a TFT substrate and a driving signal timing module which are constituent elements of the liquid crystal display (LCD) device according to the present invention.

FIG. 2 is a plan view illustrating a TFT substrate 352, a data-driving signal timing module 320 and a gate-driving signal timing module 330 which are constituent elements of the liquid crystal display (LCD) device according to the present invention.

The TFT substrate 352 will be described hereinafter in detail with reference to FIG. 2.

The TFT substrate 352 includes a transparent substrate, preferably a square plate shaped glass substrate with a high transparency, an active display area 352a which is defined as a space formed with it being offset by a predetermined distance inside of an edge of the glass substrate, an inactive display area 352b which is defined as a space formed between the active display area 352a and the edge of the glass substrate, and a thin-film transistor (TFT) (not shown) formed at the inside of the active display area 352a in a matrix form consisting of a plurality of rows and a plurality of columns by a semiconductor thin film producing process, gate lines 353 commonly connected to gate terminals of all the TFTs formed in a row of the TFT arranged in the matrix form, data lines commonly connected to source terminals of all the TFTs formed in a column of the TFT arranged in the matrix form, and electrodes (not shown) of Indium Tin Oxide material formed so that they are connected to drain terminals of the TFTs, respectively. At this time, the electrodes allow one of RGB pixels formed on the color filter substrate 351 to radiate light, which are called pixel electrodes.

All the gate lines 353 and all the data lines 354 are extended from the active display area 352a to the inactive display area 352b, and include a plurality of gate line groups 353a each consisting of a plurality of gate lines and a plurality of data line groups 354a each consisting of a plurality of data lines, respectively.

At this time, at least one gate line group 353a and the data line group 354a can be formed according to a resolution of the LCD device 900.

The data lines 354 as constructed above are supplied with the data-driving signals and the drive timing signals generated from the integrated printed circuit board (PCB) 310, and the gate lines 353 are supplied with the gate-driving signals and the drive timing signals generated from the integrated printed circuit board (PCB) 310. At this point, electric potential is generated between the pixel electrodes of the TFT substrate 352 and common electrodes of the color filter substrate 351, which causes an array angle of the liquid crystal to be varied, so that image can be displayed.

Then, the data-driving signals and the drive timing signals generated from the integrated printed circuit board (PCB) 310 are applied to the data lines by a data-driving signal timing module 320 that is connected at one end to the integrated printed circuit board (PCB) 310 and is connected at the other end to the data line group 354a.

More specifically, the data-driving signal timing module 320 includes a flexible base substrate 321, a data driving IC 322 having a plurality of input terminals and output terminals formed thereon and placed on the top surface of the base substrate 321, a plurality of data-driving signal input lines 323 formed on the base substrate in such a manner that they are connected at one ends to data-driving signal output terminals (not shown) formed in the integrated PCB 310 by an anisotropic conductive film (not shown) and connected at the other ends to input terminals (not shown) formed in the data driving IC 322, a plurality of data-driving signal output lines 355 formed on the base substrate in such a manner that they are connected at one ends to output terminals formed in the data driving IC 322 and connected at the other ends to the data lines 354 by an anisotropic conductive film, etc.

Figure 3:
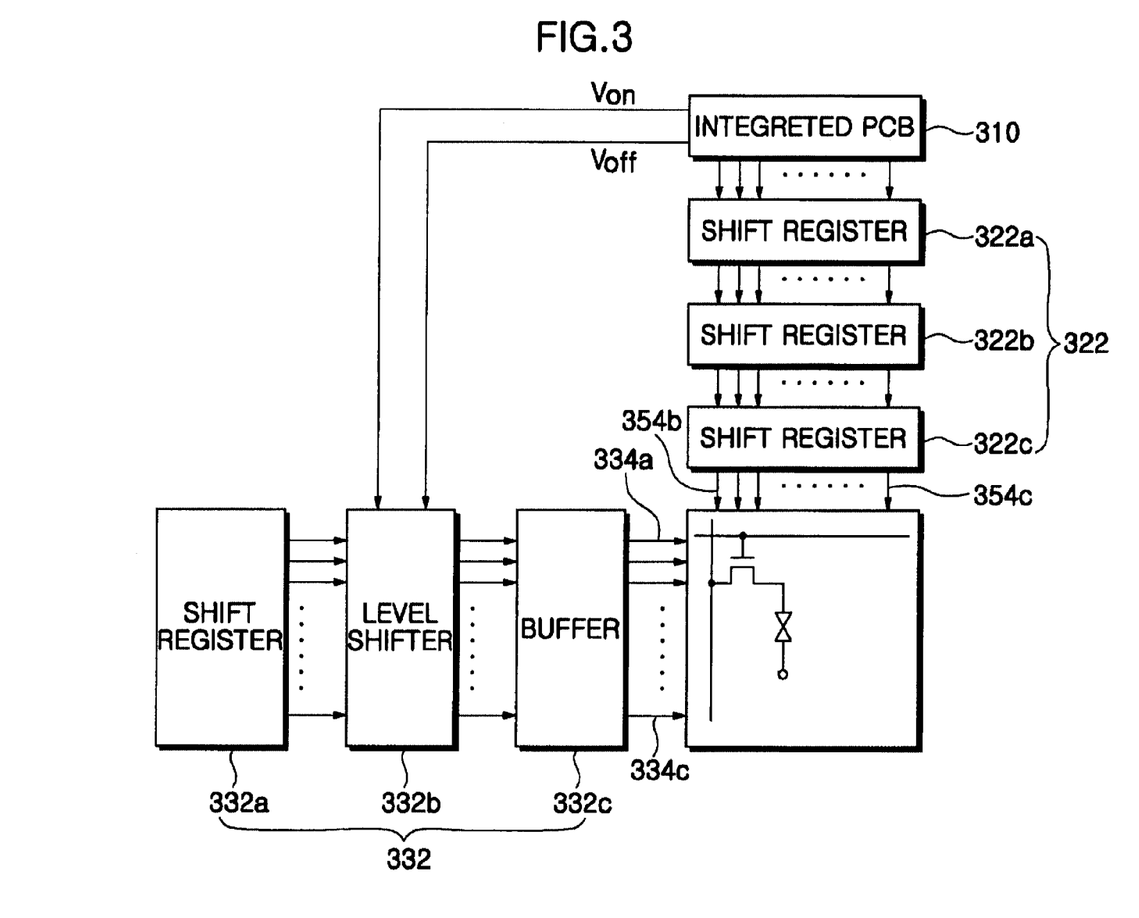
FIG. 3 is a block diagram illustrating the construction and the operation of a data driving IC according to the present invention.

FIG. 3 is a block diagram illustrating the construction and the operation of data and gate driving ICs according to the present invention.

As shown in FIG. 3, the data driving IC 322 includes a shifter register 322a for sequentially storing a digital signal corresponding to a gray scale voltage which is generated from a timing controller (not shown) of the integrated PCB 310 and will be applied from a first data line 354b to a last data line 354c, a digital/analog converter 322b for converting the digital signal stored in the shift register 322a into an analog signal suitable for applying to the data lines, and a buffer 322c for storing the converted signal and applying it to all the data lines at one time.

In the meantime, for the gate-driving signal generated from the integrated PCB 310 to be applied to the gate lines without media such as a separate PCB and connector for transmitting the gate-driving signal, it is required that the gate-driving signal first be applied to the TFT substrate 352 which in turn supplies the applied gate-driving signal to the gate-driving signal timing module 330, and then the gate-driving signal processed by the gate-driving signal timing module 330 is applied to the gate driving lines 353.

Three embodiments for implementing such a method will be described in detail hereinafter with reference to FIGS. 2 to 6.

Figure 4:
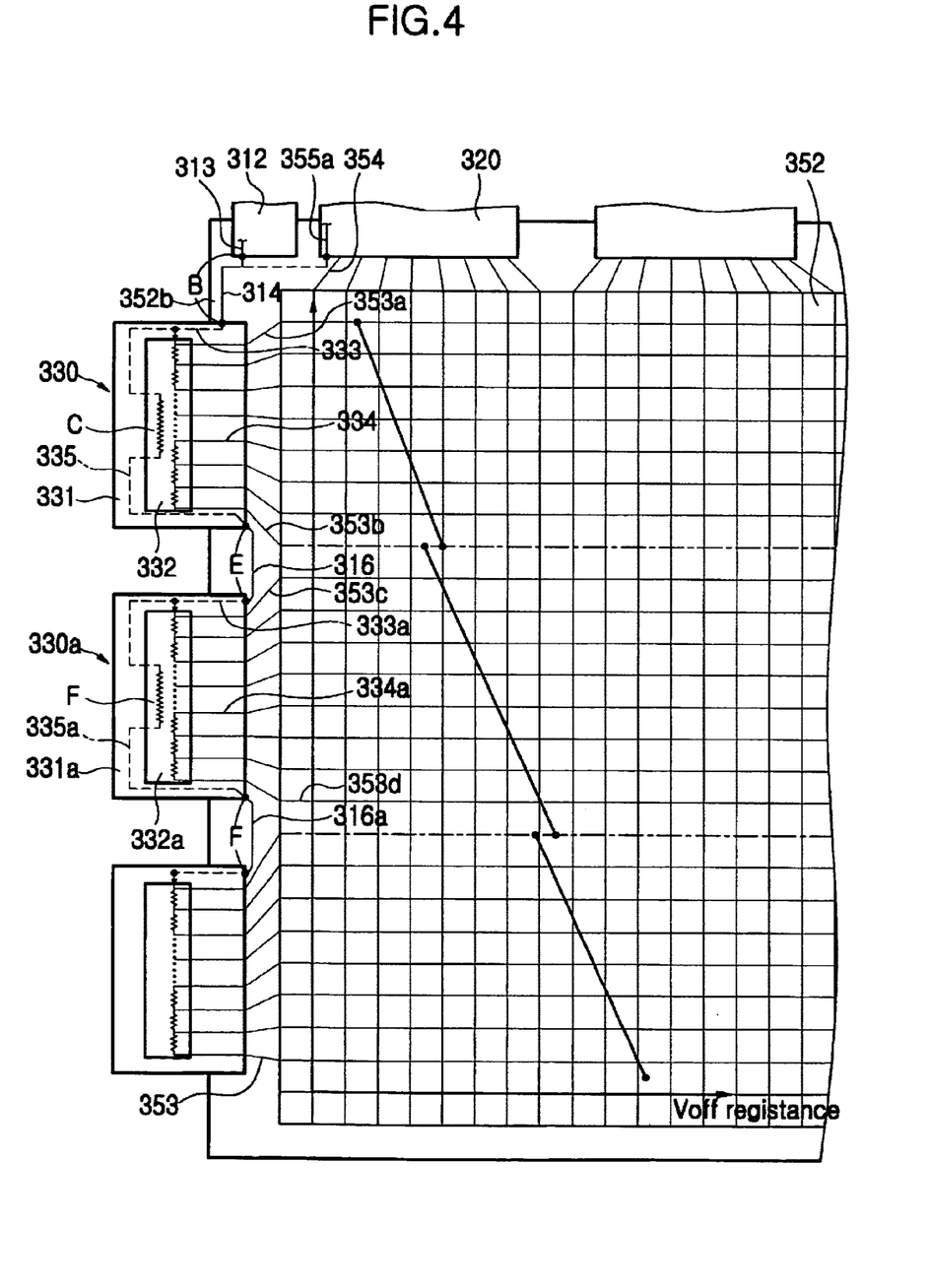
FIG. 4 is a plan view illustrating the construction of a TFT substrate and a driving signal timing module of the liquid crystal display (LCD) device according to one embodiment of the present invention.

FIG. 4 is a plan view illustrating a TFT substrate and a driving signal timing module of the liquid crystal display (LCD) device according to one embodiment of the present invention.

As shown in FIG. 4, in order to transmit the gate driving signal from the integrated PCB 310 to a first gate-driving signal timing module 330 and then apply the gate-driving signal from the first gate-driving signal timing module 330 to the gate lines 353, a signal transmitting line 313 formed on a flexible base substrate 312 is connected at one end to a gate-driving signal output terminal formed on the integrated PCB 310 and the other end of the signal transmitting line 313 is extended to an inactive display area 352b of the TFT substrate 352 close to the first gate-driving signal timing module 330.

A first signal transmitting pattern 314 for transmitting the gate-driving signal to the first gate-driving signal timing module 330 along the inactive display area 352b of the TFT substrate 352 is connected at one end to the other end of the signal transmitting line 313 formed on the base substrate 312 by anisotropic conductive film (not shown), and is connected at the other end to the gate-driving signal timing module 330 which will be described later.

As shown in FIG. 4 as another embodiment of the present invention, a dummy signal line 355a different from the data-driving signal output line 354 is formed on the data-driving signal timing module 320 positioned close to the gate-driving signal timing module 330.

At this point, a method in which the dummy signal line 335a is connected at one end to the output terminal of the integrated PBC 310 and is connected at the other end to the one end of the first signal transmitting pattern 314 for transmitting the gate-driving signal to the first gate-driving signal timing module 330 along the inactive display area 352b of the TFT substrate 352 can be used.

Then, the first signal transmitting pattern 314 is a semiconductor thin film pattern formed when forming the gate lines 353 and the data lines 354 on the TFT substrate 352.

The gate-driving signal timing module 330 connected to the first signal transmitting pattern 314 will be described in more detail hereinafter.

Referring to FIG. 4, one gate-driving signal timing module 330 of a plurality of gate-driving signal timing modules 330 and 330a includes a base substrate 331, a gate driving IC 332 mounted on the base substrate 332, a gate-driving signal input line 333 which is connected at one end to one end of the first signal transmitting pattern 314 mounted on the base substrate 331 and is connected at the other end to an input terminal of the gate driving IC 332, and a plurality of gate-driving signal output lines 334 which are connected at one ends to an output terminal of the gate driving IC 332 and are connected at the other ends to the gate lines by anisotropic conductive film.

The operation of the gate driving IC 332 will be described in detail hereinafter with reference to FIG. 3.

Referring to FIG. 3, the gate driving IC 332 includes a shift register 332a adapted to output a voltage $V_{on}$ for turning a thin-film transistor (TFT) on by a gate clock synchronized to a vertical synchronization signal generated from the integrated PCB 310, a level shifter 332b adapted to amplify the voltage $V_{on}$ applied from the shifter register 332a to be sufficient to turn-on the thin-film transistor (TFT) and produce a level of a voltage $V_{off}$ for preventing the thin-film transistor (TFT) from being turned on until the voltage $V_{on}$ is applied to all the gate lines allocated, and a buffer 332c.

Meanwhile, the gate-driving signal timing module 330 as mentioned above is allocated about 256 gate lines. Accordingly, if the number of the gate lines allocated to the gate-driving signal timing module 330 is 256, that of the gate-driving signal output lines 334 also is 256, which are granted serial numbers in such a fashion that the first output line 334a (see FIG. 3) is granted No. 1 and the last output line 334c (see FIG. 3) is granted No. 256.

At this point, a gate-driving signal outputted from all the gate-driving signal output lines ranging from 1st output line 334a to 256th output line 334c, for example, a level of the signal $V_{off}$ for maintaining the thin-film transistor (TFT) turned off is greatly important.

Like this, the reason why the level of the signal $V_{off}$ is important is that modification of the voltage level affects a reference voltage (the signal Vcom) which becomes a reference of the turning-on and turning-off of the thin-film transistor (TFT). As a result, a pixel voltage applied to a pixel electrode connected to the drain of the TFT is not equal to a desired pixel voltage, which affects an electric potential between the pixel electrode and the common electrode, and a modification of the electric potential between the pixel electrode and the common electrode changes the arrangement of the liquid crystal material, thereby generating a variation in brightness of the LCD device 900.

Most preferably, the level of the signal $V_{off}$ having an effect on brightness is equal over all the gate-driving signal output lines ranging from 1st output line 334a to 256th output line 334c. However, it is very difficult to maintain the level of the signal $V_{off}$ outputted from all the gate-driving signal output lines ranging from 1st output line 334a to 256th output line 334c in a constant state due to an internal resistance of the gate driving IC 332. For this reason, recently, it is more preferable that the signal $V_{off}$ outputted from all the gate-driving signal output lines ranging from 1st output line 334a to 256th output line 334c has a constant drift while, for example, being modified in a parabolic form in such a manner that it is modified within a range beyond a user's recognition of brightness of the LCD device 900.

Such a method requires one gate-driving signal timing module 330 if the number of the gate lines 353 determining a low resolution, for example, a horizontal resolution of the LCD display is 256 or so in total. Like this, in the case where one gate-driving signal timing module 330 is used, as the level of the signal $V_{off}$ is modified continuously, so is brightness, so that it is difficult for users to recognize a variation of brightness modified continuously, thereby preventing a problem of imbalance in brightness of the LCD device due to a modification of the signal $V_{off}$.

However, in an LCD device having a high resolution, for example, an LCD device having a high resolution of 1024× 768, an LCD device having a higher resolution of 1152×864, and the LCD device 900 having a much higher resolution of 1280×1024, assuming that the number of the gate lines 353 that one gate-driving signal timing module is capable of processing is, for example, 256, the LCD device having a high resolution of 1024×768 requires three gate-driving signal timing modules, the LCD device having a higher resolution of 1152×864 requires about three or four gate-driving signal timing modules, and the LCD device having a higher resolution of 1280×1024 requires at least four gate-driving signal timing modules.

In the case where at least two gate-driving signal timing modules are used to implement such an LCD device having a high resolution, there have been problems in that a difference in the level of the signal $V_{off}$ on a boundary surface between a signal $V_{off}$ applied to the last gate line of a plurality of gate lines allocated to any one gate-driving signal timing module 330 and a signal $V_{off}$ applied to the first gate line of a plurality of gate lines allocated to an adjacent gate-driving signal timing module 330a is increased steeply, and a modulation of the signal $V_{off}$ is generated in the course of transmitting the gate-driving signal from any one gate-driving signal timing module 330 to the adjacent gate-driving signal timing module 330a.

In order to resolve these two problems in the present invention, as shown in FIG. 4, the gate-driving signal input lines 333 and 333a and the gate-driving signal output lines 334 and 334a are formed on a plurality of gate-driving signal timing modules 330 and 330a, respectively, while a second signal transmitting pattern 316, 316a being formed on the TFT substrate 352 in such a manner that a gate-driving signal transmitting line 335 diverged in a parallel form from the gate driving input lines 333 and 333a and gate-driving signal transmitting lines 335 and 335a formed on two adjacent gate-driving signal timing modules 330 and 330a are connected to each other to transmit the gate-driving signal from any one gate-driving signal timing module 330 to the adjacent gate-driving signal timing module 330a.

At this point, when a resistance of the first and second signal transmitting patterns 314,316 and 316a formed on the TFT substrate 352 approaches "0[Ω]" and has so small a resistance that it may be neglected accordingly, an output level of the signal $V_{off}$ supplied from the gate-driving signal output lines 334 and 334a of the plurality of gate-driving signal timing modules 330 and 330a is listed as follows in [Table 1].

TABLE 1

| 1st gate-driving signal timing module | $V_{off\ 1st}$ | A [Ω] |
|---|---|---|
| | ... | ... |
| | $V_{off\ last}$ | B [Ω](B = A + driving IC internal resistance) |
| 2nd gate-driving signal timing module | $V_{off\ 1st}$ | A [Ω] |
| | ... | ... |
| | $V_{off\ last}$ | B [Ω](B = A + driving IC internal resistance) |
| 3rd gate-driving signal timing module | $V_{off\ 1st}$ | A [Ω] |
| | ... | ... |
| | $V_{off\ last}$ | B [Ω](B = A + driving IC internal resistance) |

$V_{off\ 1st}$ is a signal $V_{off}$ outputted from the first gate lines 353a and 353c of a plurality of gate lines allocated to the gate-driving signal timing modules 330 and 330a, $V_{off\ last}$ is a signal $V_{off}$ outputted from the last gate lines 353a and 353c of the plurality of gate lines allocated thereto, and the driving IC internal resistance is the difference between a magnitude of the signal $V_{off}$ outputted from the first gate lines and that of the signal $V_{off}$ outputted from the last gate lines.

Here, as shown in FIG. 4, when the signal $V_{off}$ having a predetermined level is applied to the gate driving IC 332 from the integrated PCB 310, and then is outputted through a plurality of gate-driving signal output lines 334, the signal $V_{off}$ outputted from the first to the last gate-driving signal output lines of the plurality of gate-driving signal output lines in order has a constant drift, for example, is increased linearly.

According to [Table 1], a variation in the output signal level as much as an internal resistance of the gate driving IC is generated between the signal $V_{off}$ outputted from the first gate line 353a of the first gate-driving signal timing modules 330 and the signal $V_{off}$ outputted from the last gate line 353b thereof.

At this point, the variation in the output level of the signal $V_{off}$ is increased linearly from the first gate line 353a to the last gate line 353b, allocated to the first gate-driving signal timing modules 330.

Meanwhile, since the signal $V_{off}$ applied to the first gate line 353c of the second gate-driving signal timing modules 330a is equal to the signal $V_{off}$ applied to the first gate line 353a of the first gate-driving signal timing modules 330, a variation in the input signal level as much as the sum of an internal resistance of the gate-driving IC is generated between the signal $V_{off}$ applied to the last gate line 353b of the first gate-driving signal timing module 330 and the signal $V_{off}$ applied to the first gate line 353c of the second gate-driving signal timing module 330a.

Such a variation is mostly generated at the boundary between the second gate-driving signal timing module 330a and the third gate-driving signal timing module so that one image seems to be displayed on a three way divided screen as if one screen were divided into three screens.

Consequently, as shown in FIG. 4, when the signal $V_{off}$ having a predetermined level is applied to the gate driving IC 332 from the integrated PCB 310, and then is outputted through the plurality of gate-driving signal output lines 334, although the signal $V_{off}$ outputted from the first to the last gate-driving signal output lines of the plurality of gate-driving signal output lines in order has a constant drift, for example, is increased linearly, if a plurality of gate-driving signal applying time-determining modules are used, a screen split phenomenon cannot help but be generated. Therefore, the present invention adjusts the level of the output signals outputted from all the gate-driving signal output lines 334 connected to all the gate lines 353 by positively using an intrinsic resistance of the first and second signal transmitting patterns 314 and 316, the signal transmitting line 313, and an internal resistance of the gate-driving IC 332 to prevent separation of a screen in the LCD device.

For the implementation of this, first, as mentioned above, it is necessary that when the signal $V_{off}$ having a predetermined level is applied to the gate driving IC 332 from the integrated PCB 310, and then is outputted through the plurality of gate-driving signal output lines 334, the signal $V_{off}$ outputted from the first to the last gate-driving signal output lines of the plurality of gate-driving signal output lines in order have a constant drift, for example, be increased linearly.

In the meantime, in order to allow the signal $V_{off}$ applied to the last gate line 353b of the first gate-driving signal timing module 330 and the first gate line 353c of the second gate-driving signal timing module 330a to exist within a predetermined range, a portion of the gate-driving signal transmitting line 335 required for transmitting the gate-driving signal from the first gate-driving signal timing module 330 to the second gate-driving signal timing module 330a is connected to an input terminal of the gate-driving IC 332 and passes through the inside of the gate-driving IC 332, so that the signal $V_{off}$ is modified artificially, and then is outputted to the outside of the gate-driving IC 332 through output terminals thereof.

Like this, a portion of the gate-driving signal transmitting line 335 passes through the inside of the gate-driving IC 332 so that a signal $V_{off\ 1st}$ outputted from the first gate line 353c of the second gate-driving signal timing module 330a is adjusted as much as an internal resistance generated when passing through the gate-driving IC 332.

Subsequently, the signal $V_{off\ 1st}$ outputted from the first gate line 353c of the second gate-driving signal timing module 330a is obtained by allowing the signal $V_{off\ 1st}$ inputted to the first gate line 353a of the first gate-driving signal timing modules 330 to be adjusted by the internal resistance of the gate-driving IC 322 and a resistance of the second signal transmitting pattern 316 for connecting the first gate-driving signal timing module 330 with the second gate-driving signal timing module 330a.

That is, since a portion of the gate-driving signal transmitting line 335 passing through the inside of the gate-driving IC 322 and the second signal transmitting pattern 316 serves to shift a level of the signal $V_{off}$, the portion of the gate-driving signal transmitting line 335 passing through the inside of the gate-driving IC 322 and the second signal transmitting pattern 316 serves to shift a level of a resistance $V_{off}$.

This content will be described hereinafter with reference to [Table 2] and a graph of FIG. 4.

TABLE 2

| 1st gate-driving signal timing module | $V_{off\ 1st}$ | B + Rl |
|---|---|---|
| | ... | ... |
| | $V_{off\ last}$ | B + (R1 + R2 + ... + Rn) |
| 2nd gate-driving signal timing module | $V_{off\ 1st}$ | B + C + E + R1 |
| | ... | ... |
| | $V_{off\ last}$ | B + C + E + (R1 + R2 + ... + Rn) |
| 3rd gate-driving signal timing module | $V_{off\ 1st}$ | B + C + E + F + H + R1 |
| | ... | ... |
| | $V_{off\ last}$ | B + C + E + F + H + (R1 + R2 + ... + Rn) |

Referring to the accompanying FIG. 4 and [Table 2], a resistance at a point B is 10 Ω, a resistance at an interval C is 2.5 Ω, and a resistance at a point E is 16 Ω, a resistance at an interval F is 2.5 Ω, and a resistance at a point H is 16 Ω. Also, intrinsic resistances existing in the inside of the gate-driving signal output line 334 and the gate-driving signal output line 334a of the gate-driving ICs 332 and 332a are defined as R1, R2, ..., Rn, respectively. That is, the internal resistance of the gate-driving IC 332 is 21 Ω(R1+R2+...+Rn).

More specifically, the signal $V_{off}$ generated from the integrated PCB 310 is applied to the gate-driving IC 332 in a state in which a level of the signal $V_{off}$ is increased as much as 10 Ω at a point B of the first gate-driving signal timing module 330, so that the signals $V_{off\,1st}$ and $V_{off\,last}$ are added up in series continuously by R1, R2, ..., Rn, which results in a drift of a linear function increased in a linear straight-line form having a certain gradient as shown in a graph of FIG. 4.

In an embodiment of the present invention, when R1 is about 1 Ω, the value of a resistance $V_{off}$(B+R1) applied to the first gate line 353a allocated to the first gate-driving signal timing module 330 is equal to 11 Ω, and the value of a resistance $V_{off}$(B+R1+R2+...+Rn) applied to the last gate line 353b allocated to the first gate-driving signal timing module 330 is equal to 22 Ω.

On the other hand, the value of a resistance $V_{off}$(B+C+E+R1) applied to the first gate line 353c allocated to the second gate-driving signal timing module 330a is equal to 29.5 Ω that is between 28.5 Ω and 30 Ω, since the internal resistance R1 (1 Ω) of the gate-driving IC 332a is added to the sum 28.5 Ω of the resistance 10 Ω at the point B, the resistance 2.5 Ω at the interval C of the gate-driving signal transmitting line 335 diverged in parallel from the point B, and the resistance 16 Ω at the point E.

Consequently, the difference between the resistance $V_{off}$(B+R1+R2+...+Rn=22 Ω) applied to the last gate line 353b allocated to the first gate-driving signal timing module 330 and the resistance $V_{off}$(B+C+E+R1=29.5) applied to the first gate line 353c allocated to the second gate-driving signal timing module 330a is very small so that there is only a difference in brightness which is difficult to recognize with the naked eye.

The measurement of a resistance $V_{off}$ on the boundary between the second gate-driving signal timing module 330a and the third gate-driving signal timing module in this manner shows a very small difference in the resistance $V_{off}$ as shown in [Table 2] and a graph of FIG. 4. As a result, during a progress of one frame, brightness is modified very finely, which makes it possible to prevent a screen from being seen by a user with it being separated into various screens on the boundary between any one gate-driving signal timing module and the next gate-driving signal timing module.

Figure 5:
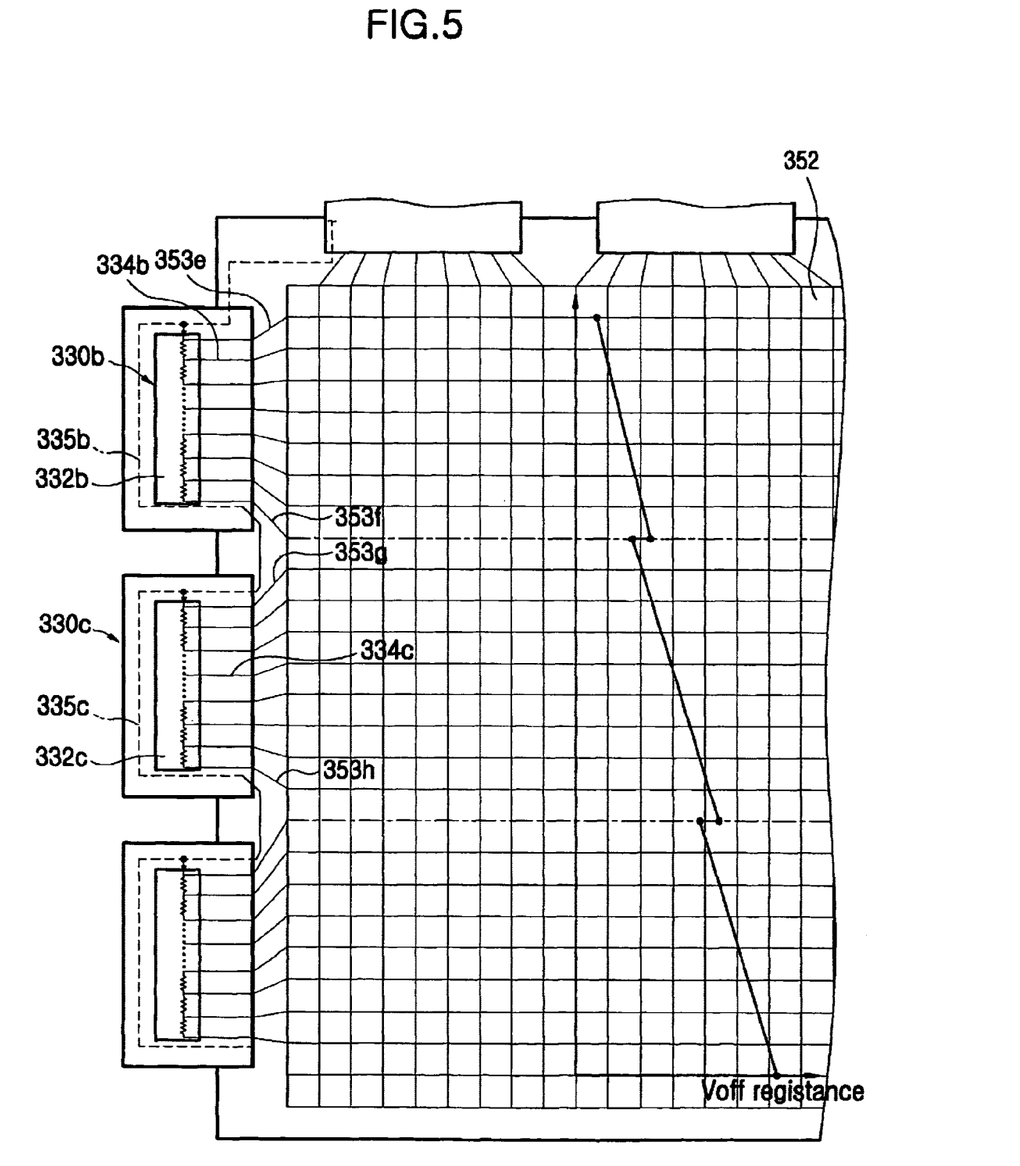
FIG. 5 is a plan view illustrating the construction of a TFT substrate and a driving signal timing module of the liquid crystal display (LCD) device according to another embodiment of the present invention.

FIG. 5 is a plan view illustrating a TFT substrate and a driving signal timing module of the liquid crystal display (LCD) device according to another embodiment of the present invention.

As mentioned above, in FIG. 4, a minimization of the difference between the resistance $V_{off\,last}$ applied to the last gate line 353b allocated to the first gate-driving signal timing module 330 and the resistance $V_{off}$ last applied to the first gate line 353c allocated to the second gate-driving signal timing module 330a requires that the signal $V_{off}$ having a linearly increased magnitude be applied to the gate lines connected to the gate-driving IC 332, and a reduction of the difference between the signal $V_{off}$ last applied to the last gate line 353b allocated to the first gate-driving signal timing module 330 and the signal $V_{off}$ last applied to the first gate line 353c allocated to the second gate-driving signal timing module 330a requires that the gate-driving signal transmitting line 335 serving to shift a level of the resistance $V_{off}$ and the second signal transmitting pattern 316 should be formed and a resistance of the gate-driving signal transmitting line 335 and the second signal transmitting pattern 316 should be adjusted, so that a variation of brightness is not generated on the boundary surface between the first gate-driving signal timing module 330 and the second gate-driving signal timing module 330a.

Unlike this, in FIG. 5, any portion of a gate-driving signal transmitting line 335b acting as a resistance component does not pass through the inside of a gate-driving IC 322b and an intrinsic resistance of the gate-driving signal transmitting line 335b itself serves to shift a level of the resistance $V_{off}$, which makes the inner construction of the gate-driving IC 322b simpler.

As a result, adjustment of the intrinsic resistance of the gate-driving signal transmitting line 335b and the resistance of the second signal transmitting pattern 316 (see FIG. 4) minimizes the difference between a resistance of a signal $V_{off}$ applied to the last gate line 353f allocated to any one gate-driving signal timing module 330b and a resistance of a signal $V_{off}$ applied to the first gate line 353g allocated to a gate-driving signal timing module 330c adjacent thereto, thereby preventing an imbalance in brightness generated between the first gate-driving signal timing module 330b and the second gate-driving signal timing module 330c by a driving method not including a physical element.

Figure 6:
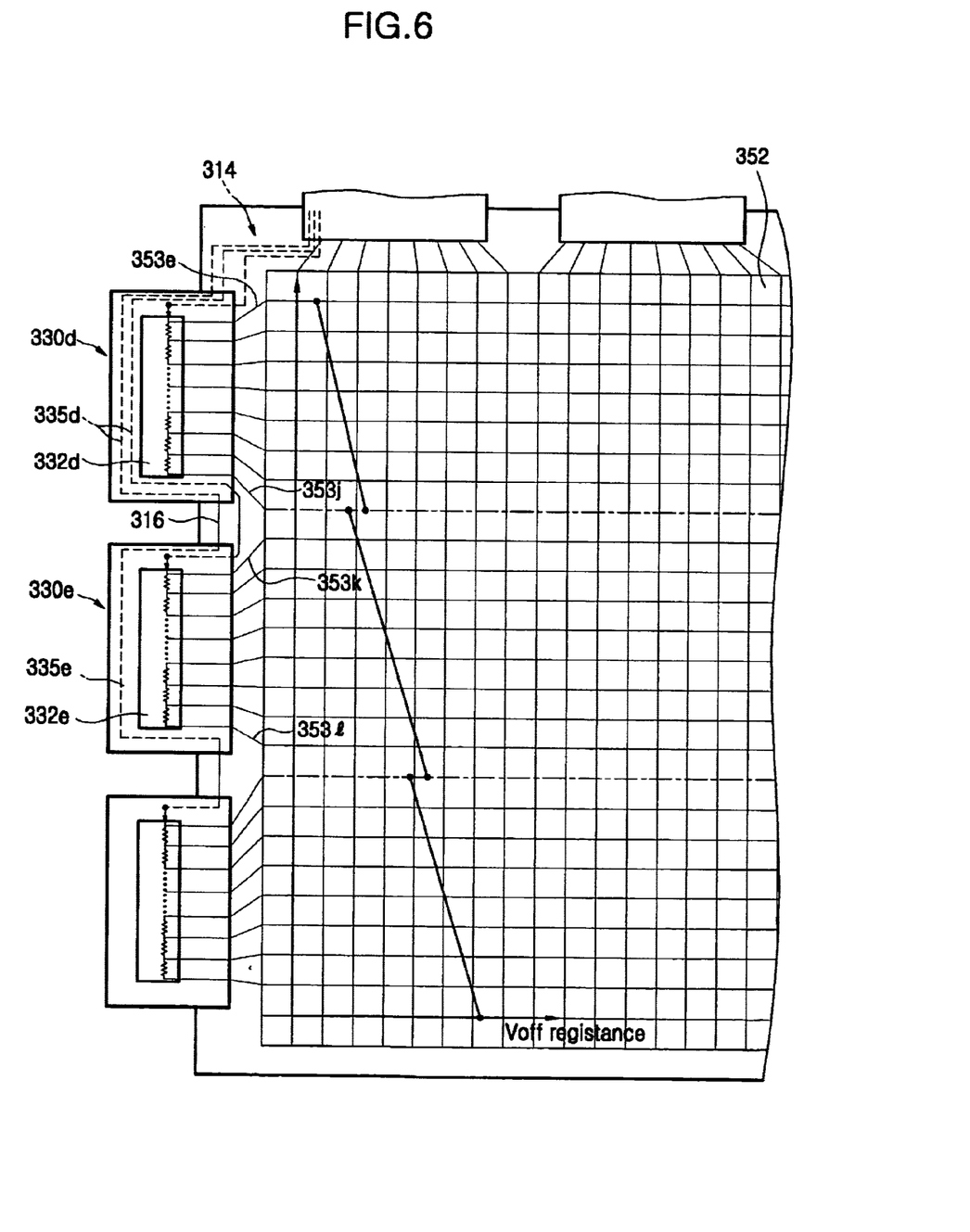
FIG. 6 is a plan view illustrating the construction of a TFT substrate and a driving signal timing module of the liquid crystal display (LCD) device according to another embodiment of the present invention.

FIG. 6 is a plan view illustrating the construction of a TFT substrate and a driving signal timing module of the liquid crystal display (LCD) device according to another embodiment of the present invention.

In FIG. 6, a gate-driving signal generated from the integrated PCB 310 is applied to a plurality of gate-driving signal timing modules 330d and 330e in such a manner that the difference between a signal $V_{off}$ applied to the last gate lines 353j and 353l allocated to the plurality of gate-driving signal timing modules 330d and 330e and a signal $V_{off}$ applied to the first gate lines adjacent to the last gate lines 353j and 353l is minimized.

According to the embodiment of the present invention shown in FIG. 6, the value of the resistance $V_{off}$ or the signal $V_{off}$ applied from the first gate line 353e to the last gate line 353j of a plurality of gate lines connected to a gate-driving IC 332d in order is increased in a linear straight-line form having a certain gradient so that the resistance $V_{off}$ applied to the fist gate line 353e is the smallest and the resistance $V_{off}$ applied to the last gate line 353j is the largest.

At this point, the prevention of a generation of the difference of brightness on the last gate line 353j connected to the gate-driving IC 332d formed on the first gate-driving signal timing module 330d and the first gate line 353k connected to the gate-driving IC 332e formed on the second gate-driving signal timing module 330e adjacent thereto requires that intrinsic resistances of first and second signal transmitting patterns 314 and 316 formed on a TFT substrate 352 be adjusted to minimize a deviation of the signal $V_{off}$ generated from the first gate lines 353e and 353k allocated to the first gate-driving signal timing module 330d and the second adjacent gate-driving signal timing module 330e, respectively.

For the implementation of this, the first and second signal transmitting patterns 314 and 316 should not be different from each other in thickness and length in such a manner that the longer the first and second signal transmitting patterns 314 and 316 through which the gate-driving signal is applied from the integrated PCB 310 become, the greater the resistance at the first and second signal transmitting patterns 314 and 316 is.

According to the arrangement and operation of the LCD panel 350 as described above, although the liquid crystal material is arranged precisely by an electric field formed between the pixel electrode to which a pixel voltage is applied and the common electrode, an image is not displayed on a screen of the LCD panel 350 because the liquid crystal material itself is not a light emitting element. As a result, the back light unit 600, the LCD panel assembly 300, and the receptacle 500 for receiving and fixing the unit 600 are necessary to supply light for transmitting the liquid crystal material(see FIG. 1).

The back light unit 600 should have a high brightness and an excellent balance in brightness. To satisfy this, it is most advantageous to use a normal radiating light source, but it is very difficult to manufacture the normal radiating light source. For this reason, finally, a ray light source such as a cold-cathode ray tube (cold-CRT) should be used. But in this ray light source, a balance in brightness is very deteriorated. Accordingly, brightness of light should be adjusted to allow light generated from the ray light source to perform the same is role as the normal radiating light source.

Thus, the back light unit 600 includes a lamp unit 610, a light guide plate 620, a reflective plate 630, and an optical diffusion sheet.

The lamp unit 610 has a cold-cathode ray tube lamp 611 for radiating light radially, and a lamp cover 612 for collecting and radiating light emitted from the cold-cathode ray tube lamp 611 in only a unilateral direction.

The light guide plate 620, which has a rectangular shape and is fitted into one side of the lamp cover 612, is arranged beneath the bottom surface of the LCD panel 350. At this point, the light guide plate 620 guides the light collected in a unilateral direction while changing the progress direction of light to direct the collected light to the LCD panel 350.

Then, when the light passes from the light guide plate 620 into the LCD panel 350, balance in brightness is best. But, when the light leaks out from the bottom surface of the light guide plate 620 downward, brightness of the light is deteriorated. To prevent this, the reflective plate 630 is disposed just beneath the bottom surface of the light guide plate 620 so that the light leaking out from the light guide plate 620 downward can pass into the LCD panel 350 again.

In the meantime, balance in brightness of the light emitted from the cold-cathode ray tube lamp 611 so that the light passes from the light guide plate 620 into the LCD panel 350, is relatively deteriorated. To prevent this, at least one optical diffusion sheet 640 is arranged between the bottom surface of the LCD panel 350 and the top surface of the light guide plate 620, so that brightness of the light becomes uniform.

At this point, the receptacle 500 is required to arrange and support the LCD panel 350, the optical sheets 640, the light guide plate 620 into which the lamp unit 610 is fitted, and the reflective plate 630 in the LCD device 900. The reflective plate 630, the lamp unit 610 and the optical sheets 640 are disposed in a structure layered in order on the base surface of the receptacle 500. Arranged on the top surface of the optical sheets is the LCD panel assembly 300, and the chassis 400 is disposed on the LCD panel assembly 300 to prevent the LCD panel assembly 300 from being separated from the receptacle 500, which is engaged with the chassis 400.

Now, a method for driving the LCD device 900 according to the present invention as constructed above will be described in detail hereinafter with reference to FIG. 4.

First, the integrated PCB 310 generates a signal of a voltage $V_{on}$, a signal of a voltage $V_{off}$, a signal of a gray scale voltage, digital data and a plurality of timing signals in response to a video signal generated from an external information processing device.

The signal of the voltage $V_{on}$, the signal of the voltage $V_{off}$, etc., among various signals generated from the integrated PCB 310 are applied to the level shifter 332b of the gate-driving IC 332 of the first gate-driving signal timing module 330 through the first signal transmitting pattern 314 formed on the TFT substrate 352 and the gate-driving signal input line 333, and the signal of the voltage $V_{off}$ of these signals is applied to all the gate lines allocated to the first gate-driving signal timing module 330 to maintain the thin-film transistor (TFT) in a turned-off state.

In the above state, the digital data generated from the integrated PCB 310 is loaded sequentially to the shift register 322a of the data-driving IC 322 through the data-driving signal input lines 323 of the first data-driving signal timing module 320 by a carry-in signal and a clock signal, i.e., the timing signal.

Subsequently, the digital data loaded to the shift register 322a of the data-driving IC 322 is applied to a shift register of a data-driving IC of a second data-driving signal timing module adjacent to the first data-driving signal timing module 320 and a shifter register of a data-driving IC of a third data-driving signal timing module adjacent thereto by a carry-out signal, respectively. Then, the digital data signal loaded to the shift register 332a of the data-driving IC 322 is supplied to a digital/analog converter 322b that generates an analog voltage signal corresponding to the digital data. The analog voltage signal is supplied to a buffer 322c which applies a corresponding analog voltage signal to all the data lines 354 by an application signal.

After that, as soon as a first gate clock generated from the integrated PCB 310 is applied to the gate-driving IC 322 of the first gate-driving signal timing module 330, the level shifter 332b applies an amplified voltage $V_{on}$ having a voltage level sufficient to turn on the thin-film transistor (TFT) to the first gate-driving signal output line 344a and the first gate line 353a through the buffer 332c.

For this reason, a first row of thin-film transistors (TFTs) connected to the first gate line 353a is turned on while a gray scale voltage supplied to the data lines 354 being applied to each of the pixel electrodes through the TFTs, so that a potential difference between the pixel electrodes and the common electrodes of the color filter substrate 351 is generated, and the liquid crystal material sealed between the TFT substrate 352 and the color filter substrate 351 is arranged to correspond to the potential difference. At this point, the light supplied from the back light unit 600 passes through the liquid crystal, which causes RGB pixels to be excited to emit a predetermined color.

Such a driving operation of the LCD device continues from the first gate line 353a allocated to the first gate-driving signal timing module 330 to the last gate line 353b.

At this time, as mentioned above, a level of the voltage $V_{off}$ applied to the last gate line 353b from the first gate line 353a in order is increased in a linear straight line form having a certain gradient by the internal resistance of the gate-driving IC 332, so that there is generated a continuous brightness difference on a screen corresponding to all the gate lines ranging from the first gate line 353a to the last gate line 353b when viewed from the outside.

As shown in FIGS. 3 to 5, since the voltage $V_{off}$ applied to the first gate line 353c allocated to the second gate-driving signal timing module is adjusted to close to 330a the voltage $V_{off}$ applied to the last gate line 353b allocated to the first gate-driving signal timing module 330 by the gate-driving signal transmitting line 335 and the second signal transmitting pattern 316 formed on the TFT substrate 352, when an image is displayed on the screen of the LCD panel 350 by the first and second gate-driving signal timing modules 330 and 330a, there is generated so highly continuous brightness difference that a user cannot recognize the brightness difference.

Such a driving method can also be applied to a third gate-driving signal timing module, so that there is generated the brightness difference within a permissible range over one frame on the LCD panel, but a user cannot recognize it.

As described above, according to the present invention, since a separate connector and a gate printed circuit board of a conventional LCD panel are not required for applying a gate-driving signal generated from an external information processing device, a thickness and the number of parts of the LCD device is reduced. Further, when the gate-driving signal is transmitted through the TFT substrate, the voltage $V_{off}$ for maintaining a thin-film transistor (TFT) in a turned-off state is modified so that generation of imbalance in brightness allows a user not to recognize it.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A module for determining a driving signal timing for a liquid crystal display (LCD) device, comprising:
   a flexible base substrate;
   a gate-driving signal input line formed on one side of the base substrate so that a gate-driving signal is applied to the gate-driving signal input line;
   a gate-driving IC mounted on the base substrate to be connected to the gate-driving signal input line, the gate driving IC adapted to modify linearly a level of the gate-driving signal inputted to a first gate line through a last gate line of a plurality of gate lines formed on a TFT substrate when allowing the applied gate-driving signal to be diverged in a parallel way so as to input it to the plurality of gate lines, and then, output the linearly modified gate-driving signal through output terminals thereof; and
   a plurality of gate-driving signal output lines formed on the base substrate in such a manner that the plurality of gate-driving signal output lines are connected to output terminals of the gate driving IC, the plurality of gate-driving signal output lines adapted to allow the gate-driving signal outputted from the output terminals of the gate-driving IC to have a linear level and to be applied to the plurality of gate lines.

2. The module according to claim 1, wherein the output level of the gate-driving signal from the output terminals of the gate-driving IC is sequentially reduced as the output terminal goes from a first output terminal to a last output terminal so that the level of the gate-driving signal from the first output terminal is the highest, and the level of the gate-driving signal from the last output terminal is the lowest.

3. The module according to claim 2, wherein the gate-driving signal from the output terminals is a turn-off voltage for keeping a thin-film transistor (TFT) for the liquid crystal display (LCD) device turned-off.

4. The module according to claim 1, wherein a signal transmitting line is formed on the base substrate of the gate-driving IC in such a manner that the signal transmitting line is connected to the gate-driving signal input line in parallel, so that the gate-driving signal applied to the gate-driving signal input line is not applied to the gate-driving IC and is bypassed to output it to the outside of the base substrate.

5. The module according to claim 4, wherein the difference between the level of the gate-driving signal from the signal transmitting line and the level of the gate-driving signal from the last output terminal of the output terminals of the gate-driving IC is adjusted to be within a predetermined range.

6. The module according to claim 5, wherein a portion of the signal transmitting line passes through the inside of the gate-driving IC while the level of the gate-driving signal from the signal transmitting line and the level of the gate-driving signal from the last output terminal of the output terminals of the gate-driving IC are within a predetermined range.

7. The module according to claim 5, wherein the level of the gate-driving signal from the signal transmitting line and the level of the gate-driving signal from the last output terminal of the output terminals of the gate-driving IC are within a predetermined range by adjusting an intrinsic resistance of the signal transmitting line.

8. The module according to claim 1, wherein the base substrate has a signal input line connected to the gate-driving IC and at least one signal transmitting line separated from the signal input line.

9. The module according to claim 8, wherein the level of the gate-driving signal from the signal transmitting line and the level of the gate-driving signal from the last output terminal of the output terminals of the gate-driving IC are within a predetermined range.

10. A liquid crystal display (LCD) panel assembly, comprising:
   an integrated printed circuit board (PCB) adapted to generate a gate-driving signal and a data-driving signal;
   a liquid crystal display (LCD) panel including a TFT substrate having a plurality of columns of data lines formed thereon so that the data-driving signal is applied to a plurality of thin-film transistors (TFTs) formed in a matrix form on a transparent substrate, a plurality of rows of gate lines formed thereon so that the gate-driving signal is applied to the plurality of thin-film transistors (TFTs), and pixel electrodes formed thereon so that a certain signal is applied thereto and maintained, the pixel electrode being connected to the plurality of thin-film transistors (TFTs), a color filter substrate having common electrodes opposite to the pixel electrodes and RGB pixels formed thereon, and a liquid crystal material sealed between the color filter substrate and the TFT substrate;
   at least one data-driving signal timing module adapted to apply the data-driving signal to the plurality of columns of data lines allocated, at a designated time;
   at least one gate-driving signal timing module adapted to apply the gate-driving signal to the plurality of rows of gate lines allocated, at a designated time; and
   a signal transmitting means having a first signal transmitting means allowing the gate-driving signal to be applied to the thin-film transistor (TFT) substrate from the integrated printed circuit board (PCB), a second signal transmitting means allowing the gate-driving signal to be applied to the gate-driving signal timing module from the thin-film transistor (TFT) substrate, and a third signal transmitting means allowing the gate-driving signal to be applied to another gate-driving signal timing module adjacent to the gate-driving signal timing module therefrom, the signal transmitting means being adapted to adjust the gate-driving signal from each of the gate-driving signal timing modules in such a manner that the gate-driving signal is modified linearly.

11. The liquid crystal display (LCD) panel assembly module according to claim 10, wherein the first signal transmitting means is a first signal transmitting line formed on the data-driving signal timing module, and is connected at one end to the integrated PCB and is connected at the other end to the second signal transmitting means formed on the TFT substrate.

12. The liquid crystal display (LCD) panel assembly module according to claim 10, wherein the first signal transmitting means is a first signal transmitting line which is formed on a flexible base substrate of the data-driving signal timing module, and is connected at one end to the integrated PCB and is connected at the other end to the second signal transmitting means formed on the TFT substrate.

13. The liquid crystal display (LCD) panel assembly module according to claim 10, wherein the second signal transmitting means is a first signal transmitting pattern formed in such a manner that the second signal transmitting means is formed on the TFT substrate, and is connected at one end to the first signal transmitting means and is connected at the other end to the gate-driving signal timing module at the same time when forming the plurality of columns of data lines and the plurality of rows of gate lines.

14. The liquid crystal display (LCD) panel assembly module according to claim 10, wherein the gate-driving signal timing module comprises:
- a flexible base substrate;
- a gate-driving signal input line formed on one side of the base substrate and adapted to allow the gate-driving signal to be applied thereto through the second signal transmitting means;
- a gate-driving IC mounted on the base substrate, the gate-driving IC having an input terminal to which the gate-driving signal is applied through the gate-driving signal input line, and a plurality of output terminals being adapted to allow an output level of the gate-driving signal from a first output terminal through to a last terminal of the plurality of output terminals to be modified continuously; and
- a plurality of gate-driving signal output lines formed on the base substrate in such a manner that each of the plurality of gate-driving signal output lines is connected at one end to an associated one of the plurality of output terminals of the gate-driving IC and is connected at the other end to an associated one of the plurality of gate lines.

15. The liquid crystal display (LCD) panel assembly module according to claim 14, wherein the output level of the gate-driving signal from the plurality of output terminals is a turn-off voltage reduced sequentially as the output terminal goes from the first output terminal to the last output terminal.

16. The liquid crystal display (LCD) panel assembly module according to claim 15, wherein the third signal transmitting means includes:
- a third signal transmitting line formed on the base substrate, the third signal transmitting line being connected at one end to the gate-driving signal input line in parallel and being extended and connected at the other end to an edge of the base substrate; and
- a second signal transmitting pattern formed on the TFT substrate, the second signal transmitting pattern being connected at one end to the third signal transmitting line and being connected at the other end to a first signal transmitting line of the next gate-driving signal timing module.

17. The liquid crystal display (LCD) panel assembly module according to claim 16, wherein the third signal transmitting line and the second signal transmitting pattern adjust the level of an output signal from the third signal transmitting line and the second signal transmitting pattern and the level of an output signal from the last output terminal of the output terminals of the gate-driving IC so that the levels are within a predetermined range.

18. The liquid crystal display (LCD) panel assembly module according to claim 16, wherein the levels of the output signal are adjusted by an intrinsic resistance of the gate-driving IC while a portion of the third signal transmitting line passes through the inside of the gate-driving IC.

19. The liquid crystal display (LCD) panel assembly module according to claim 16, wherein the levels of the output signal are adjusted by controlling an intrinsic resistance of the third signal transmitting line when forming the third signal transmitting line.

20. The liquid crystal display (LCD) panel assembly module according to claim 16, wherein the levels of the output signal are adjusted by controlling an intrinsic resistance of the second signal transmitting pattern when forming the second signal transmitting pattern.

21. The liquid crystal display (LCD) panel assembly module according to claim 16, wherein the levels of the output signal are adjusted by controlling an intrinsic resistance of the third signal transmitting line and the second signal transmitting pattern when forming the third signal transmitting line and the second signal transmitting pattern.

22. A method for driving a liquid crystal display (LCD) panel assembly, comprising the steps of:
- applying a gate-driving signal generated from an integrated printed circuit board (PCB) to a plurality of gate lines formed on a liquid crystal display (LCD) panel so that a level of a turn-off signal for maintaining a thin-film transistor (TFT) formed on the liquid crystal display (LCD) panel in a turned-off state among the applied gate-driving signal is modified linearly as the gate line goes from a first gate line to a last gate line of the plurality of gate lines;
- applying a corresponding data-driving signal generated from the integrated printed circuit board (PCB) to a plurality of data lines formed on the liquid crystal display (LCD) panel; and
- selecting any one of the plurality of gate lines, and then applying a turn-on signal generated from the integrated printed circuit board (PCB) to the selected gate line for a predetermined period of time.

\* \* \* \* \*